(12) United States Patent
Lopez Gomez et al.

(10) Patent No.: US 10,014,091 B2
(45) Date of Patent: Jul. 3, 2018

(54) SYSTEMS AND METHODS FOR HARVESTING ENERGY FROM POWER CABLES

(76) Inventors: Mariano Lopez Gomez, Santiago (CL); Borja Rodriguez Rios, Santiago (CL)

( * ) Notice: Subject to any disclaimer, the term of this patent is extended or adjusted under 35 U.S.C. 154(b) by 687 days.

(21) Appl. No.: 14/421,921

(22) PCT Filed: Aug. 17, 2012

(86) PCT No.: PCT/CL2012/000044
§ 371 (c)(1),
(2), (4) Date: Apr. 7, 2015

(87) PCT Pub. No.: WO2014/026300
PCT Pub. Date: Feb. 20, 2014

(65) Prior Publication Data
US 2015/0214746 A1 Jul. 30, 2015

(51) Int. Cl.
*H01B 13/02* (2006.01)
*H02G 7/00* (2006.01)
*H01B 7/02* (2006.01)
*H02J 50/10* (2016.01)
*H01B 7/36* (2006.01)
*H01B 13/14* (2006.01)
*H02J 7/00* (2006.01)
*F21S 4/26* (2016.01)
*F21W 111/00* (2006.01)
*H02G 3/20* (2006.01)
(Continued)

(52) U.S. Cl.
CPC .............. *H01B 7/0275* (2013.01); *F21S 4/26* (2016.01); *H01B 7/36* (2013.01); *H01B 13/02* (2013.01); *H01B 13/14* (2013.01); *H02J 7/0052* (2013.01); *H02J 50/10* (2016.02); *F21W 2111/00* (2013.01); *F21Y 2115/10* (2016.08); *H02G 3/20* (2013.01); *H02G 7/00* (2013.01); *H02G 15/08* (2013.01); *H02J 7/345* (2013.01); *H02J 17/00* (2013.01); *Y10T 29/4902* (2015.01); *Y10T 29/49071* (2015.01); *Y10T 307/25* (2015.04)

(58) Field of Classification Search
USPC ............................................................ 307/11
See application file for complete search history.

(56) References Cited

U.S. PATENT DOCUMENTS

| 8,167,471 B1 | 5/2012 | Moritz |
| 2004/0020684 A1 | 2/2004 | Yueh |
| 2004/0160774 A1 | 8/2004 | Lionetti et al. |

FOREIGN PATENT DOCUMENTS

| CH | 694442 | 1/2005 |
| CN | 102437657 | 5/2012 |

(Continued)

*Primary Examiner* — Rexford Barnie
*Assistant Examiner* — Xuan Ly
(74) *Attorney, Agent, or Firm* — Leason Ellis LLP

(57) ABSTRACT

An energy harvesting system comprising a power cable and an energy harvesting device as shown in FIG. 18. This patent also protects the energy harvesting device. This development also comprises the manufacturing method of the System and the Device and at the same time protects the repair method of the system by means of a repair kit of the system. Finally this system has a broad range of uses within which the fields of localizing, illuminating, identifying, monitoring, sounds generating, electromagnetic fields capturing and accumulating energy in power cables are covered.

31 Claims, 18 Drawing Sheets

(51) Int. Cl.
    *H02J 7/34*           (2006.01)
    *H02G 15/08*        (2006.01)
    *H02J 17/00*         (2006.01)
    *F21Y 115/10*       (2016.01)

(56) References Cited

FOREIGN PATENT DOCUMENTS

| | | | |
|---|---|---|---|
| DE | 20319394 | | 3/2005 |
| GB | 2081323 | | 2/1982 |
| JP | 2011023293 | * | 2/2011 |
| WO | WO 2012/084055 | | 6/2012 |

* cited by examiner

SYSTEMS AND METHODS FOR HARVESTING ENERGY FROM POWER CABLES

CROSS REFERENCE TO RELATED APPLICATIONS

The present application is a U.S. National Phase of International Patent Application PCT/CL2013/000044, filed Aug. 17, 2012 which is incorporated herein by reference in its entirety.

Description of what is known about this art.

Introduction to the application field of the invention.

At the present time, certain industries have benefited from a strong and steady rise in the price of products sold as a result of their activity. Such is the case of the Mining Industry which for some time has experienced a price increase of the extracted minerals. As a consequence of this phenomenon the operation has been lately focused on increasing production to take advantage of the high prices for these products. Such is the case of several minerals such as iron, copper, aluminum, silver, gold, etc.

In order to increase production and take advantage of the mineral's high prices, a good management of certain critical equipment is of the utmost importance. This is a real fact in every industry with intensive use of machinery and in the case of Mining, an important part of operational efficiency can be achieved in the first process called "Mine Operations". This set of operations includes among other steps: (i) "drilling" in which certain specialized machinery drills the rock; (ii) "explosion" in which each borehole is loaded with explosive charge. Once detonated, the rock is reduced to sizes suitable for being processed in further steps; (iii) and the last step is "haulage" in which the rock is mounted on large-sized trucks through the loading shovel or blade operation.

In a mining operation there is usually one haulage shovel for every 5 to 10 large-sized trucks, therefore the failure of one of these loading shovels may easily become a bottleneck for the whole mining operation.

Hence one of the critical equipment in mining operations is the loading shovel. In addition to this equipment there are other critical ones such as drilling machines and borers.

Identical operations are performed in underground mining but the equipment models are different especially in height and because of the space available which is narrower. Therefore, any improvement allowing a more efficient operation of this type of equipment, may turn into operational efficiencies in the mine operation as a whole.

This type of equipment such as shovels and some drilling machines are powered with three-phase half-tension electricity (8 kV). Therefore the power supply that enables these equipment to operate properly is also critical. Power is supplied through multipolar, insulated, flexible, medium voltage, trailing cables arranged at the same site where the large-sized equipment (drilling machines, shovels, and trucks) freely and constantly move.

The traffic of these large-sized equipment over the same field where the medium voltage cables are, is risky for the power supply and the safety of workers operating the equipment if eventually they damage the cables by destruction or severe abrasion when circulating over them.

On the other hand, mining operation is usually performed 24 hours a day, so there are periods of total darkness. Under this condition, cables are more likely to be damaged since their location becomes difficult. Consequently, equipment availability decreases which might cause productivity reduction in the mining operation.

Under these conditions, the feasibility of having power cables that may be localized from afar and especially in darkness by means of light emission or any other signal, is a real contribution to achieve a greater productivity and better safety and working conditions for industrial activity.

Henceforth, mining will be used only as an example of an industry in particular, but it does not mean that the application of the present invention will be circumscribed only to this activity The application of this invention is not restricted solely to mining or to a particular ore, as well as to any of its exploitation means: open-pit or opencast and/or underground methods. It is neither restricted to mine size: (Large, Medium, and Small Mining) nor to a particular equipment, except those that are powered with low, medium and/or high voltage.

PREVIOUS STATE OF ART

Nowadays there are technical solutions to aid in visualizing cables in order to minimize their damage caused by the traffic of large-sized mining equipment.

In fact, the three solutions known so far are:

a) The first solution consists on a cable with an external fluorescent-pigmented layer. However, since it is a trailing cable, the pigment is short-lived owing to its direct exposure to abrasive soil, air, water and UV radiation. Besides, the fluorescence lasts for short periods of time in the dark, because this type of pigment emits luminescence by the decay of electrons which have been previously excited by sunlight (generally pigments with resonant chemical structures) and this type of electrochemical processes are of short lifespan.

b) The second solution is the use of helical-wound reflective tapes over the cable external layer. This technology may be found on "cables with reflective Tiger Stripes", an Amer Cable product. However, as it is a trailing cable, this tape is too much exposed to soil abrasion and is easily destroyed. The tapes work through the refraction and reflection phenomena of the external incident light on the cable. This phenomenon is based on the over excitation and fast electrons decoupling in resonant chemical structures which cause the tape to shine in response to the illumination and then to stop shining if incident light is not maintained.

c) The third solution is a mixture of the two previously mentioned solutions. This means that it is a cable comprising a fluorescent or photo luminescent layer plus a reflective layer, both protected under a transparent thermoplastic jacket. This solution offers a higher resistance to abrasion, but (i) the reflective layer only highlights the cable while a light beam insides in a certain angle on the cable is present. If the incident angle is out of range, the cable does not reflect the light, thus remaining dark as well as its surrounding environment; and (ii) the luminous effect of the photo luminescent layer has a low intensity and only one hour lifespan despite of having been exposed for hours to daylight. These technologies are patented under No: CL1705-2009, PCT/IB2009/056024 and US 2010/0282491 A1.

So, it is clear that the industry requires a solution to detect the presence of the cables feeding critical equipment, a problem that has not been solved by the solutions available today.

Solution Requirements

The solution must fulfill the following requirements so that it may be a real contribution to the industry:

(i) To make a power cable visible and/or detectable either during the day or in the dark by means of luminous, sound and/or telecommunication signaling.

(ii) That the luminous, sound and/or telecommunication signaling is available as long as the equipment, whose power cable is highlighted for its protection, continues to function.

(iii) That the system is reliable to such extent that if one of its components fails (because of a cut cable or a failure inside any component) does not imply the entire system fails.

(iv) That resists abrasion as well as air, water and UV radiation exposure, typical of the environment where the cable is used.

(v) That no external illumination is required to make it visible (reflective).

(vi) That the emitted signal has enough intensity to be detected given the field and machinery dimensions.

(vii) That the signal emitted by the system has less number of limitations with regards to the reception of the signal. In the case of a light signal, this limitation is referred to the angle of vision of the observer.

(viii) To make the power source present in the cable be sufficient so that no additional power source be needed.

(ix) To make no electrical connections with the conductors of the phases. Because of the high voltages they work with, the consequently insulation or transformers required to avoid a voltaic arc would be of inadmissible dimensions for the operation.

(x) That its implementation in the cable does not mean a significant increase in cable size.

(xi) That it will be adjusted to the cable size (that is to say, within the same structure). For the particular case of the cable used to power the loading shovel, it must meet the ICEA standard (Insulated Cables Engineers Association) S-75-381-2008, part 3.22, that limits the power cables outer diameter.

(xii) That it may be implemented in the power cable by using current manufacturing techniques and the same available machinery in cable factories.

An approach for this specific problem of the industry requires a reliable energy source which is obtained by extracting this energy indirectly (without making electric contact) from the same cable intended to be highlighted. Thus, the cable itself becomes a reliable and self-sufficient power source, as long as it carries an electric current.

The internal and external energy sources present in a cable are:

(i) Electricity (voltage and current) carried by the cable. To extract energy directly from the cable an electric connection to at least one of the phases is required, but this harvesting faces a number of technical difficulties due to the presence of high voltage (8 kV): the electrical insulation needed on the connection and/or the use of transformers prevents this operation from being carried out because of the dimensions required and the lack of security of such installation.

(ii) Incidence of solar and luminous energy along the surface. The external luminous energy in combination with the existing materials (photo luminescent and reflective materials used individually or combined) do not offer an effective solution to the problem.

This is because the photo luminescent materials are not capable of delivering enough energy in terms of power and duration. On the other hand, reflective materials only reflect incident light which is reduced by the incidence angle. Finally, the opacity caused by abrasion on the outer jacket makes both materials become less effective.

(iii) Heat produced by the flowing electric current inside the cable. The current flowing through a cable only generates a great amount of heat when the current density (A/mm2) is high enough given the ventilation conditions of the said conductor. The cables are designed to have negligible heat loss, therefore this energy source is neither available nor desirable.

(iv) Electromagnetic field present because of current flowing inside the conductor. This is undoubtedly an energy source present in a monopolar cable. In fact there are documents with reference to this matter: "POWER LINE ENERGY HARVESTING POWER SUPPLY, US 2010/0084920 A1, dated April 2010.

However, the cables requiring to be illuminated and/or highlighted are preferably cables with more than one conductor wherein the flowing currents have phase difference (polyphase cables). This does not discard the monopolar power cables.

For this type of cables, the situation is more complex because of two reasons:

First, a configuration maintaining the cable size (final outer diameter) within an acceptable range should be used to extract energy from a cable with more than one inside conductor. The solution proposed by the patent "POWER LINE ENERGY HARVESTING POWER SUPPLY, US 2010/0084920 A1, dated April 2010 cannot be applied on a cable with more than one conductor or a single one, if the cable outer diameter is intended to be kept within the ranges accepted by the ICEA (Insulated Cable Engineers Association) standards S-75-381-2008, part 3.22 limiting the power line outer diameter.

FIG. 6 illustrates the traditional three-phase power cable as the one used to feed an electric shovel in the Large Mining Industry. The cable complex configuration can be observed with its multiple elements and layers per element.

In second place, to extract energy from a cable with more than one conductor inside, the current flowing inside, the phase displacement among them and the resulting geometry of the electromagnetic fields generated by each of those currents should be taken into account.

The current flowing in each of the three phase of the cable (120° phase displacement) generates an electromagnetic field in the outer perimeter of this cable. However the phasorial addition of current phases inside it is zero. Therefore, the electromagnetic field generated by the three phases as a whole is also zero. Consequently, at first sight it does not seem to be a feasible energy source since if a toroidal-shaped core is perimetrically placed outside the cable, it would have a null magnetic flux throughout its volume. Under these conditions it is not possible to extract energy from the cable with a configuration as mentioned above.

The energy sources mentioned (electrical voltage and current, solar and luminous energy, heat energy and electromagnetic energy) are presented in ways that are not suitable for the effective energy harvesting from the cable. As they have certain shortcomings they cannot be considered as viable sources for the purpose intended to be achieved.

The present invention allows to extract electric energy from the three-phase cable itself without intervening the conductors thus allowing to feed certain devices that give account of the presence of the cable on the field. The devices can be diverse such as light emitters, sound and/or telecommunication signal (GPS radiofrequency, etc.) and feed certain remote mechanical devices without restricting the harvesting and application of energy to these appliances.

The present invention solves the prior art problems and provides a real solution to the industry by meeting each of the requirements to detect the presence of cables that power critical equipment.

APPLICATION FIELDS FOR THE PRESENT INVENTION

In addition to the previously described fields (mining), the present invention solves problems in various other fields. Hereinafter certain application fields will be mentioned but they are not meant to be a limitation for the present invention to be applied.

The application fields can be classified in at least three categories:

Localization:

a. Submarine Cables Localization: the energy harvesting system allows power cables to feed a load circuit which in turn allows submarine cables to be located by means of either luminous, sound and/or telecommunication signals.

b. High Voltage Line Location: the energy harvesting system allows power cables to feed a load circuit which in turn allows to become aware of the presence of high voltage lines by means of either luminous, sound and/or telecommunication signals.

c. Overhead Lines Localization in Air Traffic Zones: the energy harvesting system allows power cables to fee a load circuit which in turn allows to become aware of the presence of high-voltage lines by means of luminous, sound and/or telecommunication signals.

Identification Through Illumination and Lighting.

a. Underground Tunnels: the energy harvesting system allows power cables to feed a load circuit which in turn allows to identify cables in underground tunnels by means of different-colored lights and additionally illuminate the said tunnel and mark the emergency exit route in a tunnel system.

b. Urban and Rural Illumination: the energy harvesting system allows power cables to feed a load circuit which in turn allows to illuminate areas close to the distribution networks.

c. Cable Identification: the energy harvesting system allows power cables to feed a load circuit which in turn allows to make a difference among phases, circuits and even cables all of which are laid on trays or ducts together with many similar cables. The system also allows to supply electric energy to a load circuit which in turn allows to codify different voltages, wire gauges, origins and/or destinations of cables, etc., by means of different colored lights and/or telecommunication signals.

d. Identification of Current Presence: the energy harvesting system allows power cables to feed a load circuit which in turn allows to identify the presence of current by emitting a signal.

I. Monitoring Variables and/or Parameters

The energy harvesting system allows power cables to feed a load circuit (or sensor) which in turn will allow: (i) to monitor operation variables, (ii) occasionally store them and (iii) from time to time to transmit them as information.

One example of an application field is monitoring variables and/or parameters in electric transmission and/or distribution networks.

Monitoring networks' physical elements and power lines, mainly outside an electric substation, represents an enormous challenge because of the great distances that must be travelled as well as the adverse weather and environmental conditions.

One solution to monitor these parameters is a network with small sensors that may transmit the information captured through wireless telecommunication to a monitoring station.

Among parameters that are of interest to be monitored in electric energy distribution systems are:

a. Those which are outside an electric substation: voltage and current of certain critical points; the arrow of a catenary aerial cable (cable's minimum distance from ground level); cable's temperature affecting their length and conductivity; power; transients and harmonics; phase displacement between current and voltage (power factor); supply quality distortions, etc.

b. Those that are inside an electric substation: transformers coils temperature; dielectric quality and transformer's oil level; switches and other equipment operating temperature, just to mention some.

Weather and environment parameters such as pressure, temperature, wind speed, pollution, amount of particulated material, solar radiation, luminosity levels, etc. may additionally be monitored. Alarm signals to prevent cables from being stolen or captured may also be monitored Emission Sound to Repel Animals:

The system to extract energy from power cables allows electric current supply to a load circuit which in turn permits to generate audible, subsonic and/or ultrasonic sounds for repelling animals such as birds, rodents, insects, among others.

Use of Storage Batteries:

This system for extracting energy from power cables allows to store electric energy in devices such as batteries, capacitors, super capacitors, etc.

The energy stored is used to keep feeding the power loads previously mentioned even when no current is flowing through the main conductor.

The duration of batteries' power supply to each of the charges will depend on loads' consumption, batteries' capacity and charging and discharging time-ratio of each battery.

III. Capture of Electromagnetic Field

The energy harvesting system from power cables allows the magnetic field concentration in the ferrous core to use it for feeding an electric load which in turn generates energy. The magnetic field concentration inside the ferrous core allows to route field lines and thereby to prevent magnetic radiation from dispersing towards the environment distant from the cable. Consequently this radiation can became useful.

Technical Problems Solved by the Invention

The already known art makes reference to the configurations for electric energy harvesting from unipolars (one single conductor) carrying alternate current from; (i) a ferrous metal core disposed perimetrically around the cable concentrating the magnetic field and creating a closed circuit of alternating magnetic flux; (ii) an iron-core coil with an induced voltage among its terminals; and (iii) a charge connected to each coil terminal that closes the electric circuit that finally extracts energy from the power cable.

This configuration is used to extract energy from monopolars and is described in patent "POWER LINE ENERGY HARVESTING POWER SUPPLY, US 2010/0084920 A1, dated April 2010.

FIG. 1 shows a conductor (101) cross-section (102), through which a current flows (103) generating a perimetric magnetic field (104) whose magnitude linearly decreases as it moves away from conductor center.

FIG. 2 shows that the magnetic field is concentrated by the ferrous ring or toroid (201). The ring is wrapped with an electric copper-wired winding (202), normally of copper, forming the coil, which is connected to feed a specified charge (203).

However, not all the power cables for residential and industrial applications are monopolars.

As a matter of fact, most of them are multipole cables: the same outer jacket holds more than one conductor carrying low, medium, or high voltage.

FIG. 3 shows the cross section of these multipole cables. Multipole cable with two conductors (301) and with three conductors (302), where the external dotted line corresponds to the outer cover or cable jacket (303).

To extract energy from a cable with more than one conductor inside, a design keeping the cable size (final outer diameter) within an acceptable range for the operation should be used. The solution proposed by "POWER LINE ENERGY HARVESTING POWER SUPPLY, US 2010/0084920 A1, dated April 2010 cannot be applied on a cable with more than one conductor if the final diameter of the cable is intended to be kept within certain acceptable size range for the industry.

Specifically, for the flexible medium voltage cables feeding the loading shovel in the large mining, ICEA (Insulated Cable Engineers Association) S75-381-2008, part 3.22, is the standard that limits those cables' outer diameter.

On the other hand, to extract energy from a cable with more than one conductor, the currents flowing through it, the phase displacement among them and the resulting geometry of the electromagnetic fields generated by each of those currents should be taken into account.

FIG. 4 depicts the simplest existing multipolar cable holding two conductors inside it.

Oppositely-directed currents with identical magnitude flow through this multipolar cable, so that the phasor sum of these circulating currents inside the cable is zero. This condition (null phasor sum) converts the multipolar in a polyphase cable. A more detailed illustration of this particular case is shown in FIG. 5. These oppositely-directed currents (103A and 103B) generate oppositely-directed magnetic fields (104A and 104B) which sum becomes null.

An important part of multipolar cables are polyphase (more than one phase) and are characterized because the phasor addition of the currents transported by their conductors is equal to zero.

Polyphase cables are used in Large Mining to supply electricity to different equipment types and specifically to haulage shovels for loading large-sized trucks. FIG. 6 shows in detail the cable used. It is a medium voltage, three-phase cable (601A, 601B, and 601C). Each phase has an electric power single conductor (602), a first internal semiconducting layer (603), its electric insulation (604), an external semiconducting layer (605) and an electrostatic screen (606). Additionally, the cable has a ground check wire (607) and two ground wires (608) all of which are covered with an external jacket.

Nevertheless, to extract energy from this polyphase cable, the system displayed in FIG. 2 (toroid surrounding the cable as the one proposed in patent POWER LINE ENERGY HARVESTING POWER SUPPLY, US 2010/00084920 A1 DATED April 2010) has no effect at all, because the phasor summation of the currents flowing through the three conductors is zero, hence the magnetic field throughout the toroid is null. Therefore, there is no induction in the coil and no electric energy harvesting from the cable.

FIG. 7 is a generic representation of a three-phase system (the most common of the polyphase systems). For any of the possibilities provided by this display: Three-phase Generator (701) connected in Delta (703) or in Star (704) with a Three-phase Charge (702) Balanced or Unbalanced, connected in Delta (703) or in Star (704), the phasor addition of the currents in the conductors a-A, b-B, c-C, n, is zero, so if those conductors belong to a same cable, the present art to extract energy from monopolar cables (POWER LINE ENERGY HARVESTING POWER SUPPLY, US 2010/00084920 A1 DATED April 2010) does not work.

Based on this technique, the tree-phase cable should be surrounded by the core throughout its outer perimeter in order to concentrate the magnetic field present outside the cable into the core. As previously mentioned, the phasor addition of the currents is zero, therefore the magnetic field throughout the core is zero.

The present invention allows to extract electric energy from the three-phase cable itself, without having electric connection with the conductors, thus allowing to power certain devices that reveal the presence of the cable in the field. The devices may be diverse such as light emitters, sound emitters and/or any telecommunication signal (GPS radiofrequency), etc. and to feed certain remote mechanical devices, without restricting the harvesting and application of energy to these appliances.

The present invention solves the previously mentioned technical issues and is a real solution for the industry, since it meets the requirement to detect the presence of power cables that energize feeding critical equipment.

DESCRIPTION OF THE INVENTION

Be it understood that the present invention is not limited to the special methodology, compounds, materials, manufacturing techniques, uses and applications described herein, because they may vary. It should also be known that the terminology employed herein has the only purpose of describing a special representation and is not intended to limit the present invention scope and potential.

Power cable will be defined as a conductor (generally made of copper) or a set of conductors covered with an insulating or protector material.

We define a three phase power cable as the one that uses at least three wires that represent each of the phases. They are covered by protector or insulating layers and materials.

Be it understood that in the list of claims and throughout the text the use of the singular form does not exclude the plural form except when it is clearly contained in the context. For instance, when the reference is made to one "element" is a reference to one or more elements and includes equivalent forms known by those who are familiar with the art. Another similar example is the reference to "a step", "a stage" or "a method" when the reference aims at one or more steps, stages or methods and even may include sub-steps, sub-stages or sub-methods either implicit or that may happen suddenly.

Every conjunction used has to be understood in its less restrictive and more inclusive possible meaning. For instance, the conjunction "or" should be understood in its orthodox logic sense and not as an excluding "or", except when the context or text expressly requires it or states it. Be understood that the described structures, materials, and/or elements are also making reference to those functionally equivalent so that restrictive and endless enumerations be avoided.

The expressions used to denote approximations or concepts should be understood in their intrinsically meaning, unless the context is expressing a different reading. Every technical and/or scientific name or term used herein has the usual meaning given by a person of ordinary skill in this art, except when a different meaning is clearly expressed.

Methods, techniques, elements, equipment and materials are described although similar and/or equivalent methods, techniques, elements, equipment and materials to those already described can be used or preferred in practice and/or trials of the present invention.

Be it understood that the structures described herein also refer to any similar or functionally equivalent structure.

All patents and other publications are included as a reference with the purpose of describing and/or informing, for instance, the methodology described in such publications that might be useful regarding the present invention. These publications are included only as a source of the existing information before the register date of the present patent application.

In this regards, nothing should be interpreted as an admission or acceptance, rejection or exclusion with respect to the authors and/or inventors are not entitled or that such publications are dated before other previous ones, or by any other reason, Is part of the scope of the present invention an energy harvesting system comprising bare power cables or with their protector and/or insulation, with one or more phases, of low, medium or high voltage, and an energy harvesting device with its different uses.

Is part of the scope of the present invention a power cable with one or more phases holding an energy harvesting device like the one mentioned above and its 'diverse uses.

Is part of the scope of the present invention an energy harvesting system from cables which also allows the accumulation of the energy extracted by means of batteries, capacitors, super-capacitors, etc., and its different uses.

Is part of the scope of the present invention an energy harvesting device like the one previously mentioned.

Is part of the scope of the present invention the manufacturing process of the energy harvesting system in one or more phases, that incorporates the energy harvesting device and/or the accumulation device, mentioned above, in the power cable and its' diverse uses.

Is part of the scope of the present invention the Repair Kit for the energy harvesting system which comprises the energy harvesting system especially dimensioned to perform repairs, preferably one meter and special tapes to seal the previously prepared energy harvesting system to replace the cable damaged section.

Is part of the scope of the present invention the repair of the energy harvesting system in cables that have a built-in harvesting device which allows to repair the energy harvesting system and for the accumulation system previously mentioned and their different uses.

Is part of the scope of the present invention the repair of the power cable that does not have the built-in energy harvesting device so that it may allow the previously mentioned energy harvesting system and/or the accumulation system and their different uses be incorporated.

Description of the Energy Harvesting System

The energy harvesting system is; (i) a system that harvests electric energy from a power source (the same power cable) for any of the functions intended for the power cable. (ii) a system that keeps the size of the power cable (outer diameter) within acceptable ranges; for the particular case of the power cable used to feed the loading shovel and which complies the ICEA (Insulated Cable Engineers Association) 575-381-2008, part 3.22 standard, that limits the outer diameter of medium half-voltage flexible power cables for mining; (iii) a system that modifies minimally the current manufacturing process of polyphase cables; (iv) a system that uses the same machinery already installed in power cable factories.

The energy harvesting system comprises 2 components which are one or more phases of an electric power cable to extract energy from the same power cable and an energy harvesting device.

The energy harvesting device makes use of three basic components (1, 2, 3) and another optional (4).

1) An helical continuous ferrous core.
2) Copper coils.
3) Charges determined by the intended use for the energy extracted by the system (for instance, cable illumination, telecommunication signal emission, sound signals, etc.)
4) Accumulators. The extracted energy from the cable can be previously stored by batteries, capacitors, and/or super-capacitors before being consumed by the respective charges and its different uses.

FIG. 8 shows the energy harvesting system implemented in one of the phases of a cable with illumination LEDs as an example of loads for the coils.

Just as mentioned before, the energy harvesting device makes use of three basic components:

1) Core: made of ferrous material, which purpose is to concentrate throughout its volume the perimetral magnetic field present in any conductor wherein a current is flowing.

The geometry of this magnetic field concentrator material can be diverse: solid body, set of metal sheets, wires, or several wires of smaller diameter.

Any material with ferromagnetic features is suitable for a core because it is a good conductor of magnetic flux: galvanized iron, cast iron, black wire, steel, some types of stainless steel, siliceous iron or related material, preferably wrought iron.

This core material is relevant because the magnetic field generated by the electric current prefers to travel distances inside a ferrous medium rather than in a medium such as air, thereby the magnetic field concentration is achieved as well as the consequent decrease of the system dimensions.

The device core type is an open, continuous, helical core. It is an open core because it has separated ends unlike a typical closed core used in transformers. It is a continuous core because an iron wire is the only and individual component or the core all along the electric cable. Finally, it is described as helical because it is wrapped in a spiral fashion around the cable, around itself and at the same time causing the said core to advance along it.

The above description of the core allows the whole system (core, coils and loads) to behave as if it was one single element i.e. an energy harvesting device. This configuration allows it to be embodied into the cable by adding one more stage to its manufacturing process with the same machinery available today in manufacturing cable industry.

2) Coils are made of any malleable electrical conducting material such as aluminum, silver, gold, electrically insulated, preferably annealed enameled copper.

The coils are made by winding up in a spiral form an electrical conductor around the core or they are prefabricated on a reel, a non-conducting hollow element (tube) around which the annealed enameled copper wire is wounded up. The ferrous core described in the previous paragraph passes through the reel center.

There is a separation distance among the coils embodied in the core. A voltage is induced among the endings of these coils, due to the changing magnetic field captured by the core.

The extracted energy allows to electrically feed one or more loads that define the use or the application of the system and its different uses.

3) The loads connected to the coils will depend on the appliances intended to be operating. Some examples, without being a limitation, of the various loads that may be connected to the coils are: LEDs to generate a light signal, sound emitters, telecommunication emitters, etc.

4) Accumulators. The loads can be connected directly to the coils if a constant low consumption is required or otherwise, through some power accumulator device such as a capacitor or a battery, whether a system with higher consumption or one of long-term use is needed even if there is current or not at all in the conductor.

Description of a Manufacturing Process of a Monophase or Polyphase Energy Harvesting System The energy harvesting system is assembled into a monophase- or polyphase power cable by using basically the same machinery and manufacturing procedure currently applied in the cable manufacturing industry. This technology is the same applied to manufacture cables, wires and ropes and has been available for more than 50 years. FIG. 9 shows the generic procedure for manufacturing different types of cables. This procedure is described in the internet:

http://turnkey.taiwntrade.com.tw/en/Content,aspx?ID=65, and is broadly known by means of other internet information links.

Independent of the type of material, either silk threads, polyester filaments, iron wires, copper wires, sewing thread, etc., it is available the known technology used to keep several thin elements together (with respect to the final diameter required) with the purpose of shaping one single new element made of several ones with a smaller diameter or section The process consists of feeding each of the elements comprised into the new element and as these elements are being put together, two (or more) elements are being twisted over the longitudinal axle of the assembly until all the elements are wound around the longitudinal axle.

After being joined and helically twisted around the longitudinal axle of the assembled elements, they are wound up in reels.

The process of twisting and winding can be made with two or more elements which can become elements of a new twisting and winding process. This process can be carried out over and over with the purpose of having the final desired product made of as many as the elements required.

This process is the base for manufacturing cables and incorporating the proposed system to extract energy from a polyphase-cable, and it fits in with the current technology for manufacturing cables, threads and ropes.

As part of this invention, the manufacturing process of the energy harvesting system from the same cable is detailed as follows:

1. The first step in the manufacturing of the energy harvesting system is to give the exact gauge (diameter) to each of the conductors that form the power cable according to its specification. Starting with wire rods (in the case of rigid cable) or wires with less diameter (in the case of flexible cable), each of them originally in a reel, are assembled into a single conductor built with wires that have been assembled and helically twisted to provide the conductor the gauge specified for the power cable. FIG. 10 shows a phase of a medium-voltage three-phase power cable. The conductor (602) comprises 7 rod wires.

In this stage of the process, only the bare conductor is left twisted around a new reel larger than any of the preceding ones where each of the constituent wires or rods were wound up.

2. Next, for low-voltage power cables, the necessary extruded insulation is added to each of the cable conductors to give zero resultant electric field generated by the cable voltage, as per its specification. Each insulated conductor stays in a new reel.

3. Each extruded layer controlling the electric field is added to each phase of the medium and high-voltage power cable (FIG. 6, numbers (601A, 601B and 601C), FIG. 10, number (601)): internal semiconducting layer (FIG. 6, number (603)), FIG. 10, number (603)), electric insulation layer (FIG. 6, number (604), FIG. 10, number (604)), outer semiconducting layer (FIG. 6, number (605), FIG. 10, number (605)), electrostatic earth shield (FIG. 6, number (606), FIG. 10, number (606)). Each layered phase stays in a new reel.

4. Once the construction of each phase of the power cable is finished, the energy harvesting device is physically embodied into it (FIG. 11, numbers (802, 803 and 804) where the load, especially in this scheme, is a LED number (804). Complying the cable specifications, each of the coils, loads, and optionally electric charge accumulators, have already been incorporated in the device. This specification determines the coil type, the enameled wire gauge, (its inductance and electrical resistance strength), the separation space between coils, the type of load carried by each coil and the type of accumulators considered.

The energy harvesting device is in a reel waiting to be incorporated into each of the phases as specified for this particular cable manufacturing order. The energy harvesting device can be covered with an extruded fill insulation and protective layer which gives to it an evenly circular cross-section in all its length. If the loads of the coils are light-emitting elements, the filling material should be transparent or translucent. Once the filling material is incorporated, the energy harvesting device is wound up around a new reel.

The energy harvesting device is embodied in at least one of the phases already finished (FIG. 12, number (601)) such that the path of the phase over the power cable be helical (FIG. 12, number (802)), paying attention to the pitch (number of turns made by the energy harvesting device around the phase along one meter length of the phase) so that it allows the best functioning of the energy harvesting device. This pitch is also determined by the specification of the cable. Each phase of the power cable with the embodied energy harvesting device is wounded on a separate new reel.

All the phases are put together with the previously included energy harvesting device (FIG. 6, number (601A, 601B and 601C)), ground conductors (FIG. 6, number (608)) and ground check (FIG. 6, number (607) that will build up the energy harvesting system. Each of these elements was in its own reel (FIG. 13, numbers (601A, 601B and 601C)). All the phases are twisted helicoidally forming one single set and rolled on a new reel.

By extrusion, a jacket is added to the phases forming the cable (FIG. 6, number (609), FIG. 14, number (609)). This jacket should be translucent and transparent polymeric jacket if the loads in the coils of the energy harvesting system are light-emitting components.

The energy harvesting system is already finished and is wound on its final reel.

The energy harvesting system can be cut of any length so that such length is longer than the length in between the coils installed in the finished cable and does not destroy the coils or their loads.

Description of the Energy Harvesting Device Manufacturing Process

The manufacturing process for this device comprises the following stages:

a.—The available ferrous core length will be stipulated according to the energy expected to be extracted from the device.

b.—The coils are incorporated by winding them around the core. The number of coils will depend on the amount of energy expected to be extracted with the device. The coils may be wounded around the core, or factory assembled like small springs to be incorporated around the core.

c.—The loads that will consume the energy extracted by the device are parallel-connected to the coils. (Loads can also be accumulators or storage batteries).

d.—Upon being assembled, the device can also be covered with a polymeric material.

Description of the Repair of an Energy Harvesting System with a Built-In Harvesting Device To repair the energy harvesting system, it is necessary to consider its two components: the power cable and the energy harvesting system.

The repair of a power cable is based upon two fundamental principles: (i) after being repaired, the cable must have the same original electrical and mechanical characteristics and (ii) each layer of the cable should be rebuilt in order to have the same original electrical and mechanical characteristics.

On the other hand, the energy harvesting device, subject-matter of this invention, has a very particular feature.

It is modular, that is to say, the set of energy harvesting devices (section of iron wire, coil and load) along the power cable, works in such a manner that an arrangement (device) acts independently from the rest of the arrangements. All the arrangements may belong to a same unit (the same iron wire or ferromagnetic core) thus its incorporation in the cable will be easy, but they work independently one from another. This is especially important when eventually a determined section of the set is damaged. If the set or arrangement is damaged in any section of the power cable, the rest of the arrangement may keep on operating with no problem.

This modular concept facilitates the repair of the cable because the repair of the energy harvesting system needs only to add a section of the energy harvesting device, consisting of the ferromagnetic core (iron wire) and the corresponding coil, loads and accumulators. This section can be incorporated in the commercial kits for cable repair and so the elements needed to perform the repair of the energy harvesting system will be easily available.

Thus the repair proceeding of an energy harvesting system with a built-in energy harvesting device is as follows:

1. The damaged energy harvesting system should be removed from the operation and eventually changed by another in perfect operating conditions.

2. The damaged section of the energy harvesting system that was removed from the operation and that is intended to be repaired should be identified.

3. Then the energy harvesting system should be cut to eliminate the damaged section.

4. Next, each of the layers of the energy harvesting system should be removed following the instructions of the cable repair kit that is being used. In general, the instructions to be followed indicate that the layers of each of the ends of the energy harvesting system will be removed in such a way that the outermost layers should be longer when removed, as seen in FIG. 15. The layers must be removed for later reconstruction layer by layer with special materials and tapes.

5. The energy harvesting system to be repaired is considered to be divided into three zones: two zones corresponding to the sections of the energy harvesting system that are in good conditions and one zone that has to be repaired. The energy harvesting devices in the first two zones will also be in good conditions and will work independently in each of the sections just because a current will flow again through the phase in which the energy harvesting device is implemented.

6. That is why the embodiment of the energy harvesting device in the repair zone is absolutely optional and if it is not incorporated, it will not affect the energy harvesting system operation in the rest of the cable if it is not incorporated.

7. When working inside the energy harvesting system by removing each of the layers, the built-in energy harvesting device will appear. It is convenient to remove it and then to decide if a new energy harvesting device will be assembled which will work independently from those already present in the other sections of the cable.

8. The detailed procedure steps to be followed in case the energy harvesting device is decided to be incorporated are:

9. Each layer of the energy harvesting system must be rebuilt (FIG. 10) with special materials and tapes (shown in FIG. 16) where the first semiconductor layer of the cable (number 603), the primary insulation (number 604), the outer semiconducting layer (number 605) are rebuilt.

10. Once each rebuilt inner layer has been rebuilt, the energy harvesting device should be assembled. The device has already its elements included: iron wire that works as a ferromagnetic core (FIG. 17, number (802)), the copper coils (FIG. 17, number (803)), and loads (FIG. 17, number (804)).

11. The energy harvesting device is manually assembled by helically winding the iron wire around each of the phases to be incorporated in the device.

12. There is no need to make connections or welding between the built-in energy harvesting device and the new energy harvesting device.

13. The following steps of the repair are identical to normal repair of a cable which can be performed by any skilled person. Finally, the outer jacket is incorporated. As the loads for the energy harvesting device are light emitting diodes LEDS, the jacket must be translucent or transparent polymeric jacket so the emitted light in the interior, can be seen from the exterior.

Description of the Repair of a Power Cable that has no the Built-In Energy Harvesting Device, in Order to Incorporate it in the Cable and Build the Energy Harvesting System The steps to be followed to repair a cable that does not have the built-in energy harvesting device are the same as those above described for repairing a cable with a built-in energy harvesting device Characteristics of the Proposed Energy Harvesting System Based upon the energy harvesting system in a polyphase cable configuration, the energy harvesting device of the cable itself, its manufacturing process, its repair and embodiment in a cable, the conclusion is that the characteristics of this invention are:

1. It is similar to the current manufacturing methods for power cables, i.e. the incorporation of technology in the manufacturing process of any cable considers the same equipment currently installed in the cable manufacturing industry and the same manufacturing techniques applied today.

2. It allows the cable size (final outer diameter) be maintained within the acceptable ranges for its use.

3. It is a source of energy that only requires the same feeding current of the machinery for its good performance.

4. The helical open core may or may not make an electric contact with the conductors upon which it is wound and its performance is the same, requiring no additional insulation.

5. It is fed only by the magnetic energy available outside each of the power cable phases with the possibility of being implemented in one or more phases.

6. It only requires that a determined amount of current is circulating through the phase on which the device is implemented. Since the cables feed equipment that operates practically 24 hours a day, there is a current running permanently through them which causes the energy harvesting system to become a permanent energy source.

7. The device is modular, that is, the set of devices extracting energy (section of iron wire, coil, and load) is mounted at full length of the power cable in such a way that each device acts independently from the other devices. All the devices may belong to a same unit (to the same iron wire) which facilitates their embodiment in the power cable, but they work independently. This is especially important when a determined section of the energy harvesting system is eventually damaged. If any section of the power cable in the energy harvesting system is damaged, the rest of the devices can continue to operate without problem.

8. It can be used in cables designed for operating in environments with high mechanical requirements. The technology can be incorporated in a power cable inside the jacket that protects it, therefore it can be used in "Heavy Duty" environments. (great mechanical requirements for traction, abrasion, torsion, tear, underwater, etc.)

Due to these conditions, the proposed system embodied in a power cable, is an important contribution to the industry.

Example of the Application of the Energy Harvesting System

The practical example of the energy harvesting system application is a mining three-pole flexible medium-voltage power cable with the built-in energy harvesting device. This can be seen in FIGS. 10, 11, 12, 13 and 14. However this is just an example that does not limit the use of the energy harvesting device in other types of cables.

Example of the Application of the Manufacturing Method of the Energy Harvesting System Each of these figures illustrates the manufacturing process of the energy harvesting system and how the device embodiment takes place in a specific part of the process.

Hereinafter, each of the figures representing the stages that configure the embodiment process of the device during the manufacturing process of an energy harvesting system in a three-polar, mining, flexible, medium-voltage cable will be described in detail. However, this particular application does not restrict the use of the energy harvesting device in other power cable types.

FIG. 10 shows one phase of a three-phase, medium-voltage power cable. The conductor (602) comprises 7 rod wires. This phase has already incorporated the layers corresponding to a medium-voltage power cable (medium-voltage ranged between 2 kV and 69 kV). All these layers meet the function of controlling the electric field generated by the potential difference between the conductor (602) and the electrostatic shield (606).

This way the conductor (602) already has the gauge (diameter) according to its specification and its internal semiconducting layer (FIG. 10, (603)), primary electrical insulation (FIG. 10, (604)), outer semiconducting layer (FIG. 10, (605)), electrostatic earth shield (FIG. 10, (606)).

Each of the three phases of power cables (601A), (601 B). and (601C) with all its layers included, stays in a new reel waiting to be twisted together with the other two phases, the ground check cable (607) and the ground lines (608).

Once the construction of each phase of the three-phase power cable is finished, the energy harvesting device of the cable is physically embodied independently in each of the phases. The device is a malleable, long and continuous iron wire (ferromagnetic core) (FIG. 11, (802)), which has the copper coils (FIG. 11, (804)), and the loads (FIG. 11 (804)), incorporated. The load, especially in this scheme, is a LED (light emitting diode).

The device with its open, continuous ferromagnetic core has already embodied each of the coils, loads and, optionally, electric charge accumulators, all determined by the cable specifications. This specification determines the coil type (the enameled wire gauge, its inductance and resistance), the separation distance between coils, the type of load carried by each coil and the type of accumulators considered.

The energy harvesting device (the iron wire (ferromagnetic core) with each and all the multiple coils and loads and eventually, accumulators arranged at full length of the ferromagnetic core) is in a reel waiting to be embodied in each of the phases specified for by the particular cable. The energy harvesting device can be covered with an extruded fill insulation and protective layer which gives to it a circular and even cross-section area. In the case the coil loads are light-emitters, this filling material should be translucent or transparent. Once the filling is done, the core is wounded in a new reel.

The energy harvesting device is embodied in at least one of the phases already finished (FIG. 12 (601)) such that the path over the phase be helical (FIG. 12, (802)), and the pitch (number of turns made by the energy harvesting device around one meter long of the phase) be such as to allow the optimal functioning of the energy harvesting system. This pitch is also determined by the cable specification. Each of the phases with the embodied energy harvesting device is phase-wound on a new reel.

All the phases combined together (one or all the phases with the energy harvesting device incorporated) (FIG. 13 (601A, 601B and 601C)) are helically twisted forming one single arrangement to be wound on a new reel.

A jacket is extruded to the set of twisted phases that configure the cable (FIG. 14, (609)), taking care if the coil loads of the energy harvesting system are light-emitters, the jacket extruded must be translucent or transparent polymeric jacket. Once the energy harvesting system is finished, it is wound on its final reel.

This figure shows a conductor (101) carrying current (103) which generates a magnetic field (104)

Number 101 represents the electrical conductor.

Number 102 represents the electrical conductor cross-section area.

Number 103 shows the direction of the current flow through the cross section of the electrical conductor.

Number 104 represents the perimetral magnetic field generated by the current flowing through the conductor cross-section area, by following the right-hand convention.

Figure 1:
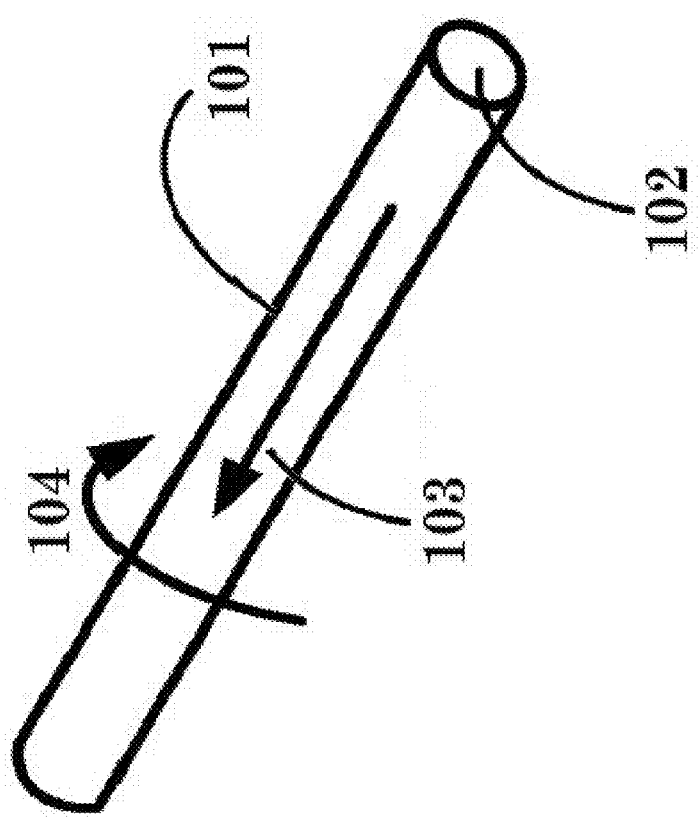
FIG. 1
Figure 2:
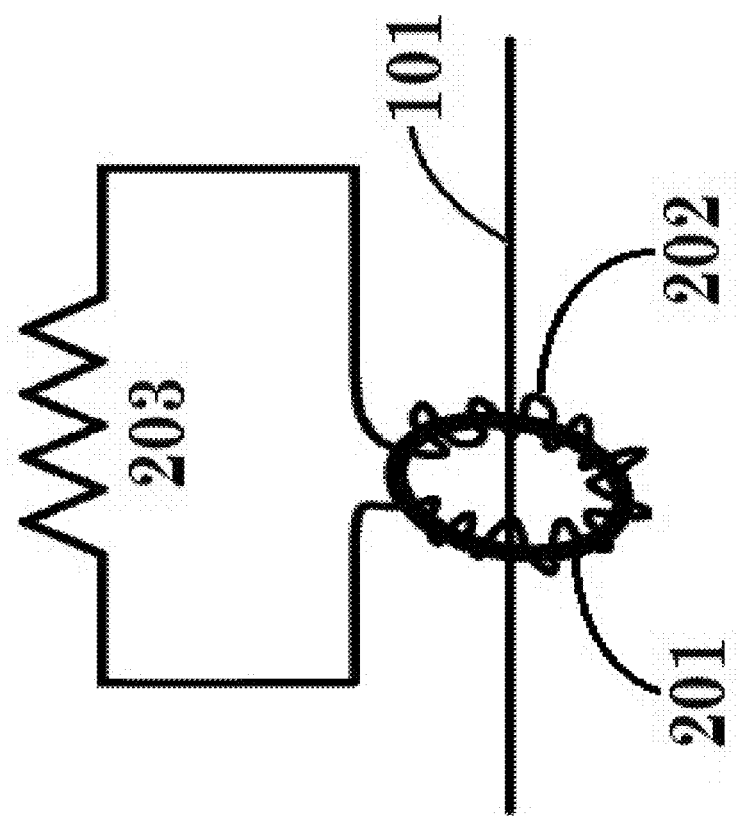

FIG. 2 illustrates the design usually applied to extract energy from a conductor.

Number 201 represents a ferrous toroid or ring.

Number 202 shows the coil, an insulated wire winding.

Number 203 represents a determined load or charge.

Figure 3:
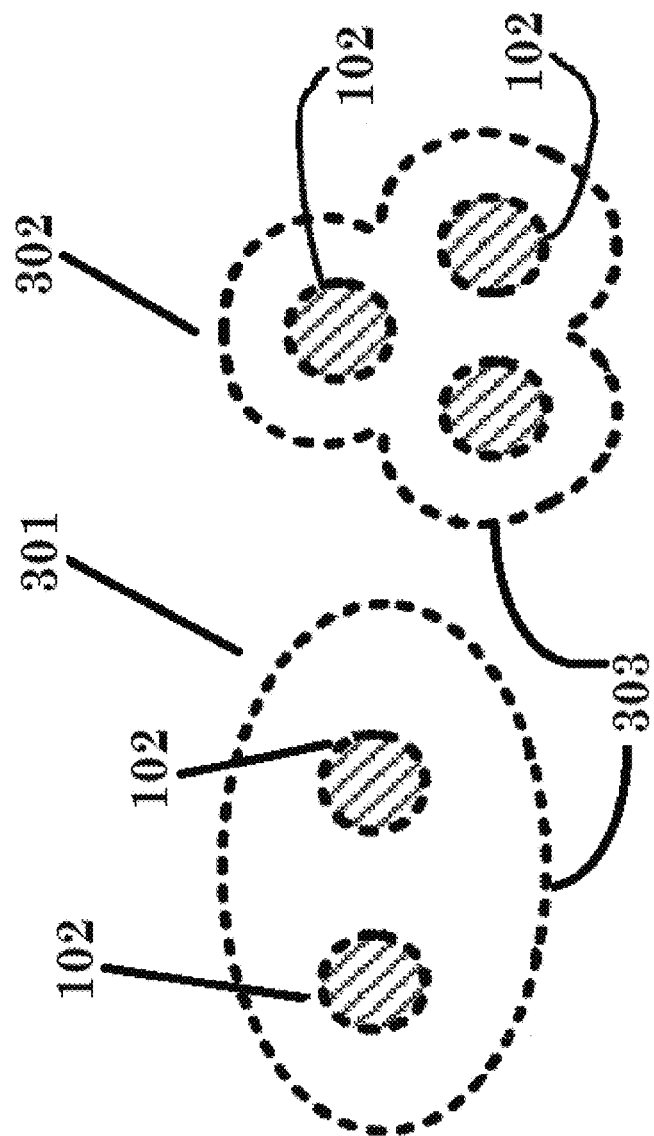

FIG. 3 depicts the cross-section area of two power cables comprising two and three conductors Number 301 illustrates a power cable comprising two conductors.

Number 302 represents a power cable comprising three conductors.

Number 303 shows the outer jacket of each cable. Number 102 represents the electrical conductor cross-section area.

Figure 4:
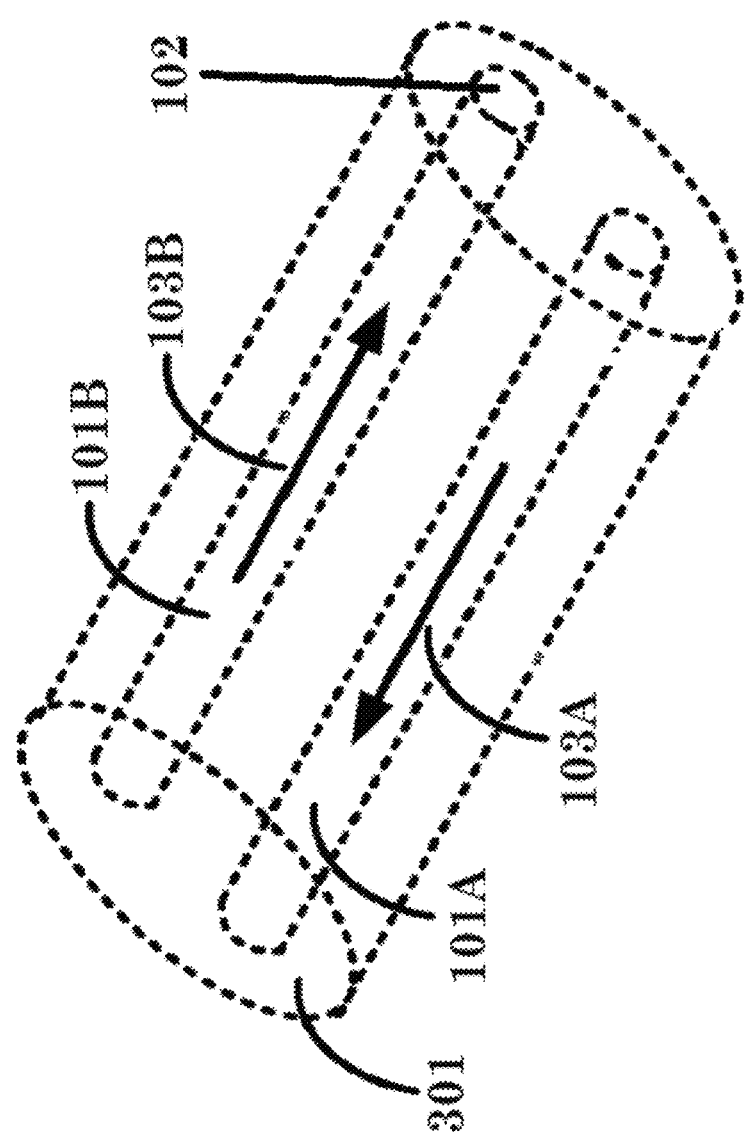

FIG. 4 displays the simplest existent multipole power cable: two conductors comprised in one cable.

Numbers 101A and 101B represent the cable electrical conductors.

Number 102 represents the electrical conductor cross sectional area.

Numbers 103A and 103B show the direction of a current flowing through the electrical wire cross-sectional area.

Number 301 shows a power cable comprising two conductors.

Figure 5:
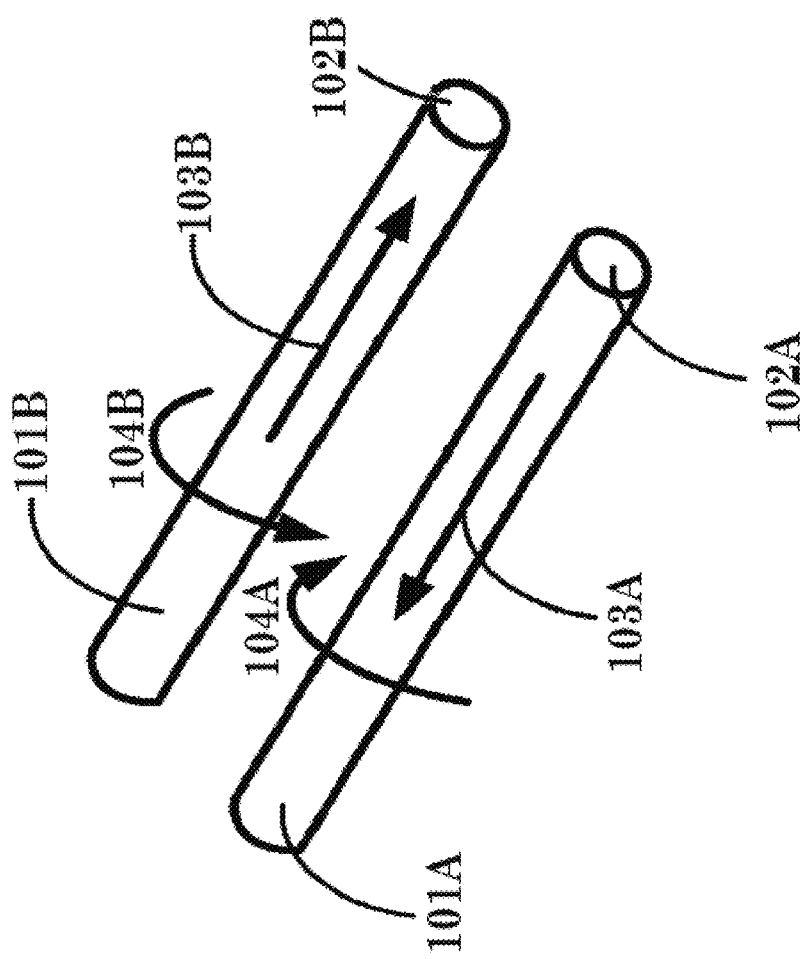

FIG. 5 shows the same two conductors shown in FIG. 4 (belonging to a same cable), but with the oppositely directed flowing currents. The oppositely directed magnetic fields can also be seen (104A and 104B)

Numbers 101A and 101B represent the power cable electrical conductors.

Numbers 102A and 102B represent the electrical conductor cross-section area.

Numbers 103A and 103B represent the direction of the current flowing through the electrical conductor cross-section area.

Numbers 104A and 104B represent the perimetral magnetic field generated by the current flowing through the electrical conductor cross-section area, by following the right-hand convention.

Figure 6:
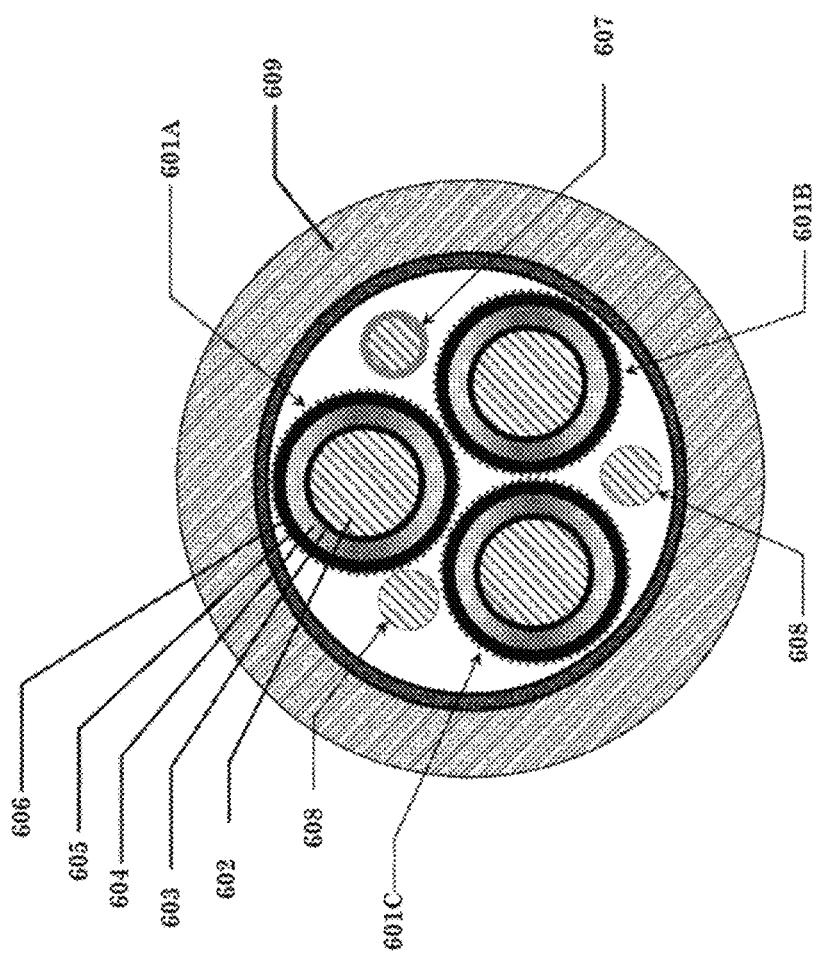

FIG. 6 depicts a medium-voltage cable with three-phases.

Number 601A depicts the complete phase A of the power cable.

Number 601B depicts the complete phase B of the power cable.

Number 601C depicts the complete phase C of the power cable.

Number 602 depicts the power electrical conductor of each of the power cable phases.

Number 603 depicts a first inner semiconducting layer of each of the power cables phases.

Number 604 depicts the electrical insulation of each of the power cable phases.

Number 605 depicts the external semiconducting layer of each of the power cable phases.

Number 606 depicts the electrostatic screen of each of the power cable phases.

Number 607 depicts the ground check wire of the medium-voltage cable.

Number 608 represents the two ground conductors of the medium-voltage cable.

Number 609 is the outer jacket covering all the medium-voltage cable components above mentioned.

Figure 7:
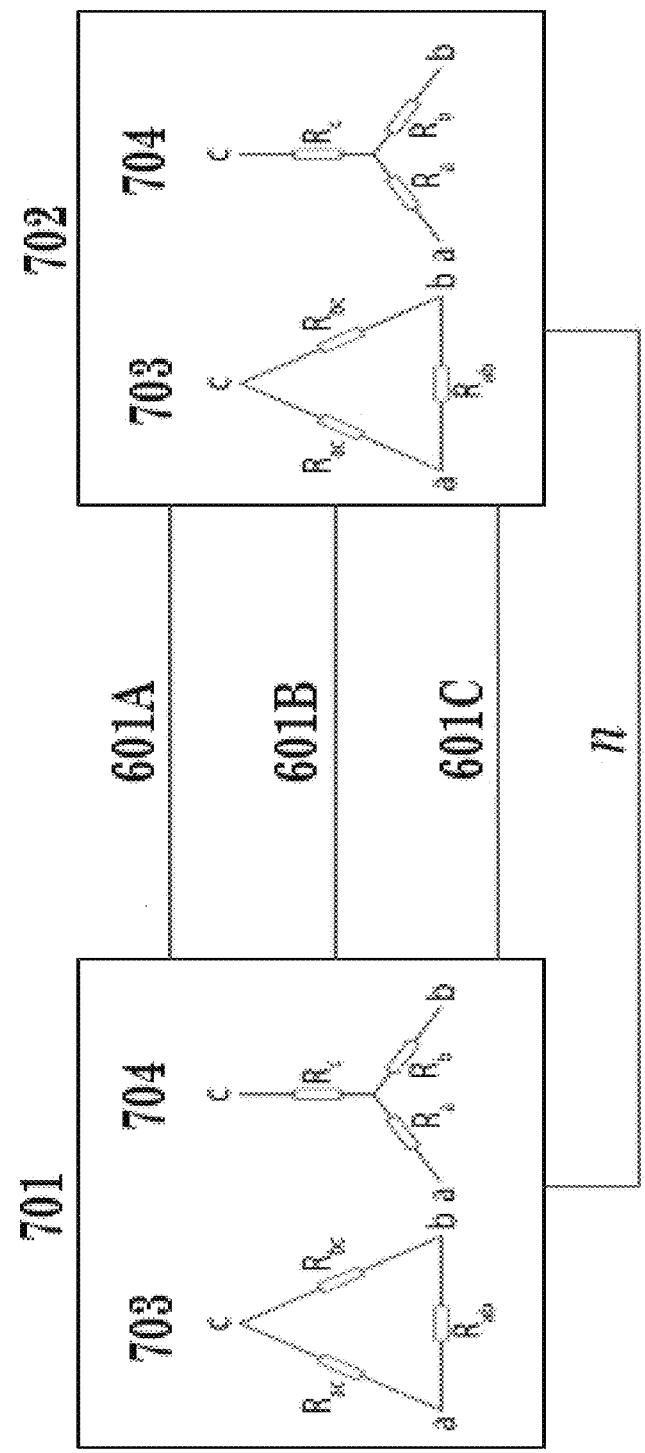

FIG. 7 displays a generic representation of a three-phase system (the most common polyphase system)

Number 601A depicts the complete phase A of the power cable.

Number 601B depicts the complete phase B of the power cable.

Number 601C depicts the complete phase C of the power cable

Number 701 shows a three-phase generator.

Number 702 depicts a three-phase load (for example, the equipment fed through the cable).

Number 703 is a representation of one of the possible Delta connections.

Number 704 is a representation of one of the possible Star connections.

Figure 8:
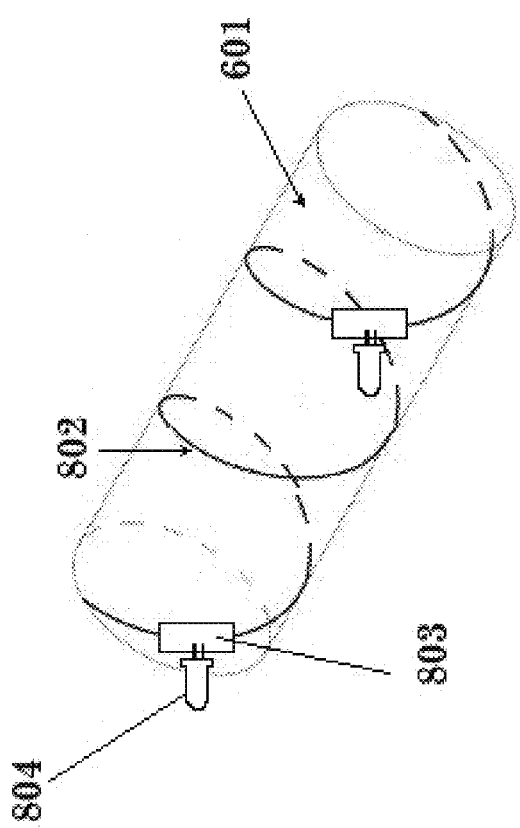

FIG. 8 shows one phase of the power cable with the built-in energy harvesting device.

Number 601 shows the power cable phase.

Number 802 shows the ferromagnetic core.

Number 803 displays a diagram of the coil.

Number 804 shows the load. This specific drawing shows a LED, but it may be any load fed with the energy extracted from the power cable through the core and coil.

Figure 9:
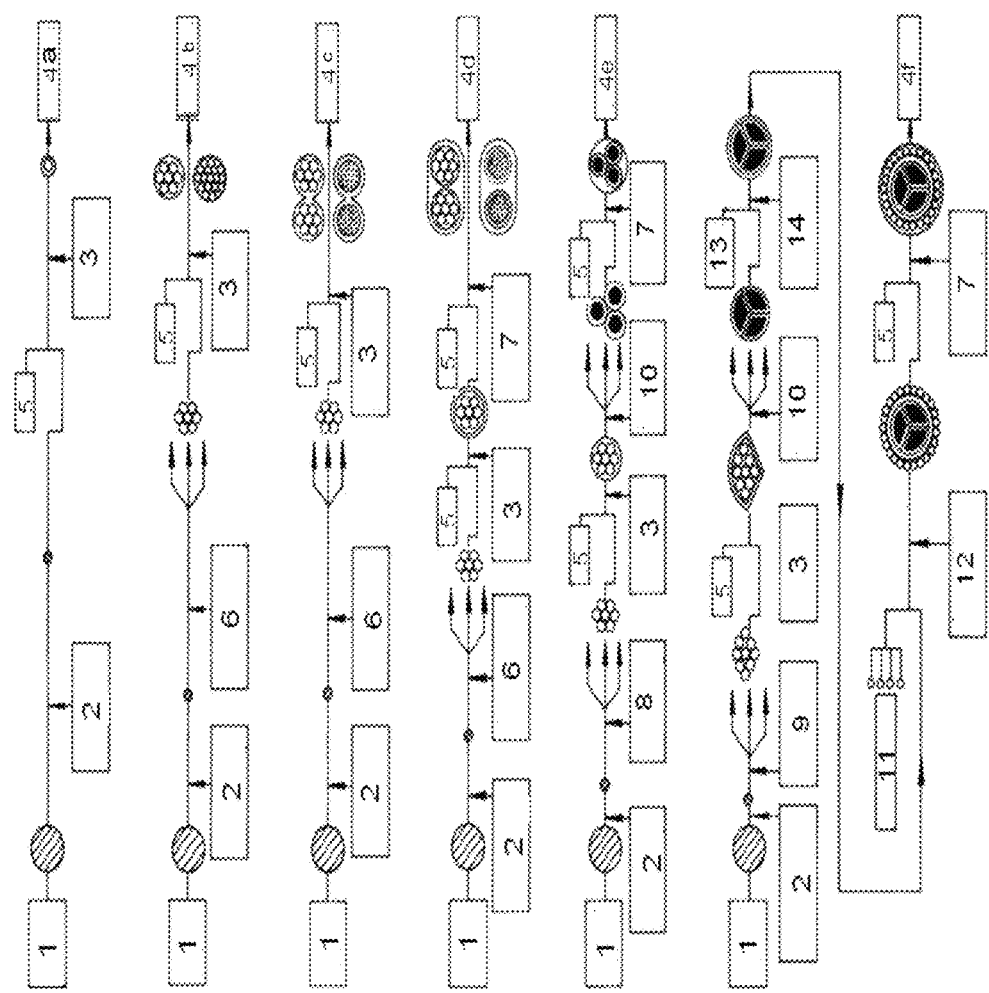

FIG. 9 is a diagram of the different cable manufacturing processes. The energy harvesting system may be implemented in every of these manufacturing processes. The figures enumerated are:

Number 1 represents the Copper Wire Rod.

Number 2 represents the Working Process and Annealing.

Number 3 represents the Insulating Process with PVC.

Number 4a is Manufactured Single Cable.

Number 4b represents the Manufactured Multi-Wire Cable.

Number 4c is Manufactured Flexible Cable

Number 4d illustrates the Manufactured Flat Cable with two Wires.

Number 4c is showing the Manufactured Power Cable.

Number 4f is showing the Manufactured Shielded Cable.

Number 5 shows PVC.

Number 6 shows the Braiding and Twisting Process.

Number 7 shows the Outer Cover Layer Process.

Number 8 represents 7 to 61 Stranded Wires

Number 9 shows the Braiding and Configured Process.

Number 10 shows the Design of Cores

Number 11 shows a Steel Cable.

Number 12 shows a Shielded Steel Wire.

Number 13 is XLPE (Cross-Linked Polyethylene).

Number 14 is a Line CCV.

Figure 10:
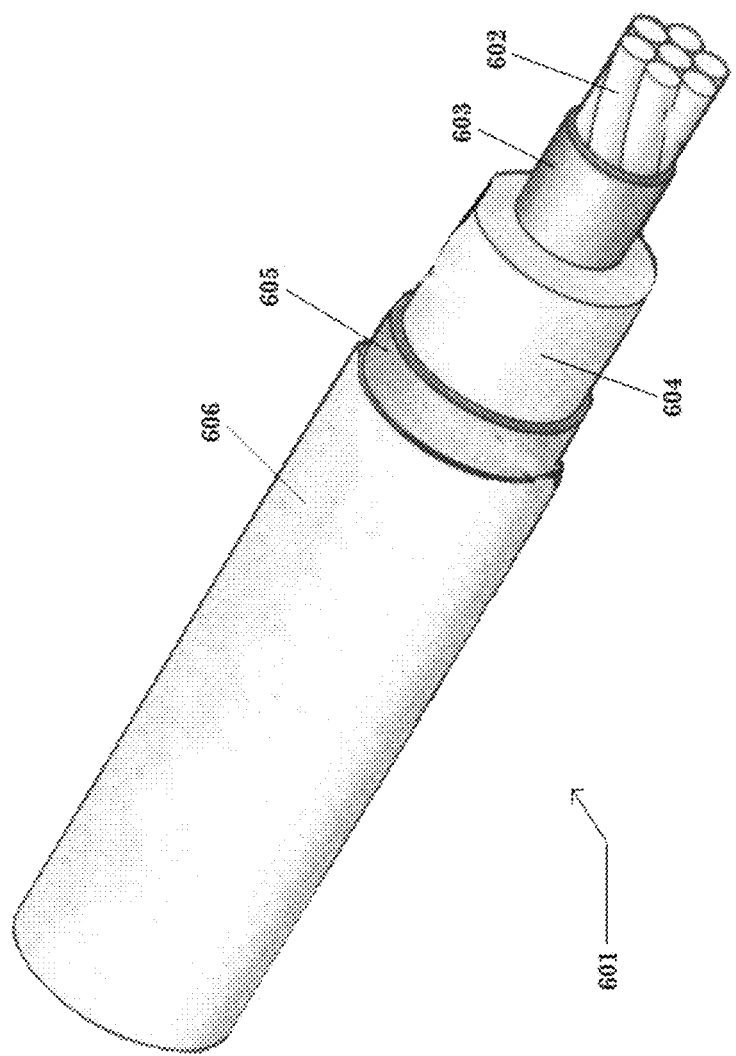

FIG. 10 depicts one of the phases of a tripolar medium-voltage cable with its layers shown schematically.

This figure corresponds to a particular case which can be applied together with the energy harvesting device.

Figure 11:
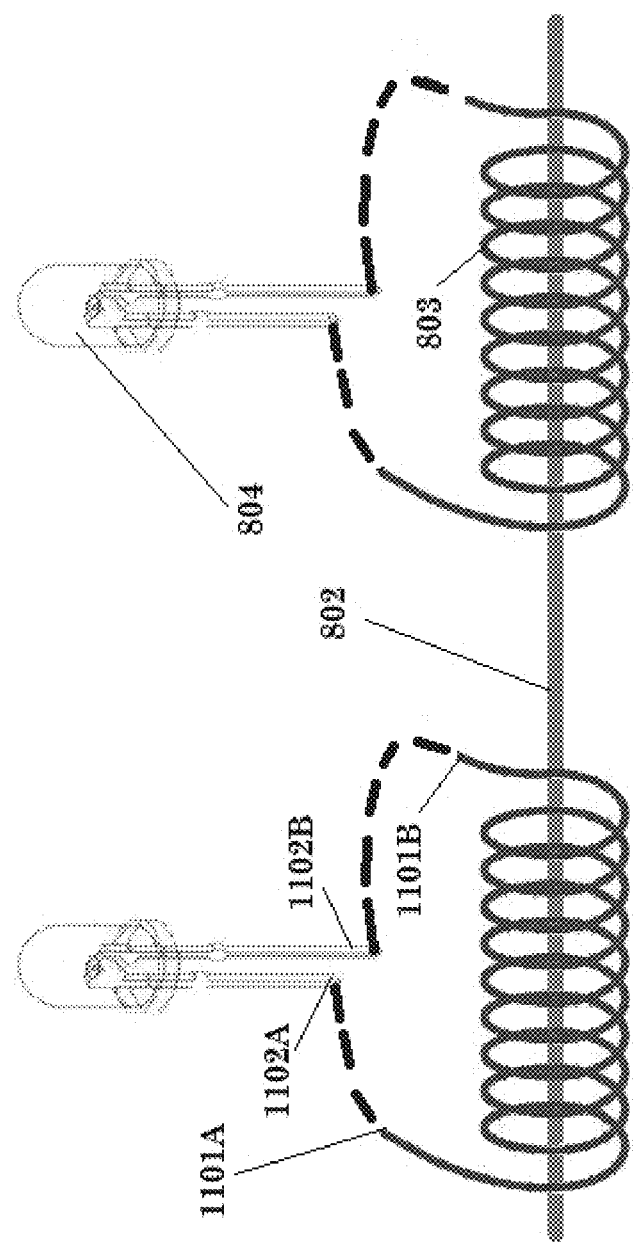

FIG. 11 shows a set of the energy harvesting device (802), (803), (804). The load (shown in this figure) to be connected to the coils is a light-emitting load (LED). The new elements in this representation are:

Number 1101A corresponding to one of the two terminals of the coil.

Number 1101B is the other terminal of the coil.

Number 1102A is one of the two terminals of the load (LED).

Number 1102 B is the other terminal of the load (LED).

This figure represents an application example and this is a special case of the energy harvesting device application.

Figure 12:
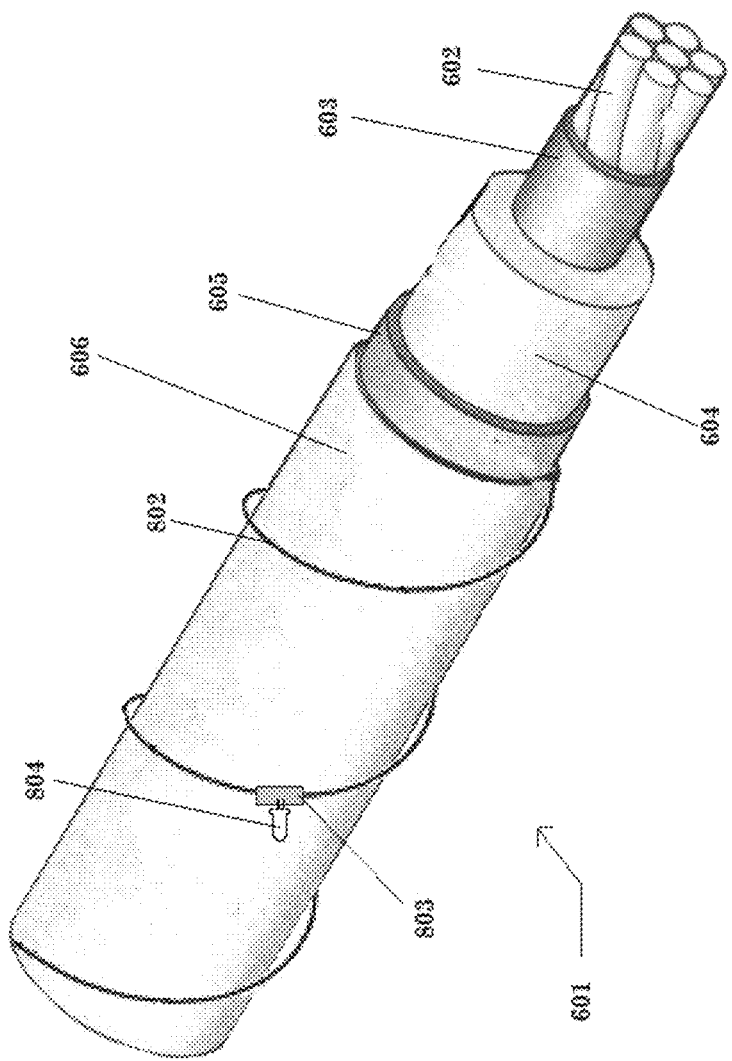

FIG. 12 represents an energy harvesting device scheme (802), (803) and (804) already installed in one of the phases of a three-phase power cable. The load connected to the coil is a particular one: a light-emitter (LED). This figure corresponds to the application example and is a particular case of the energy harvesting device application.

Figure 13:
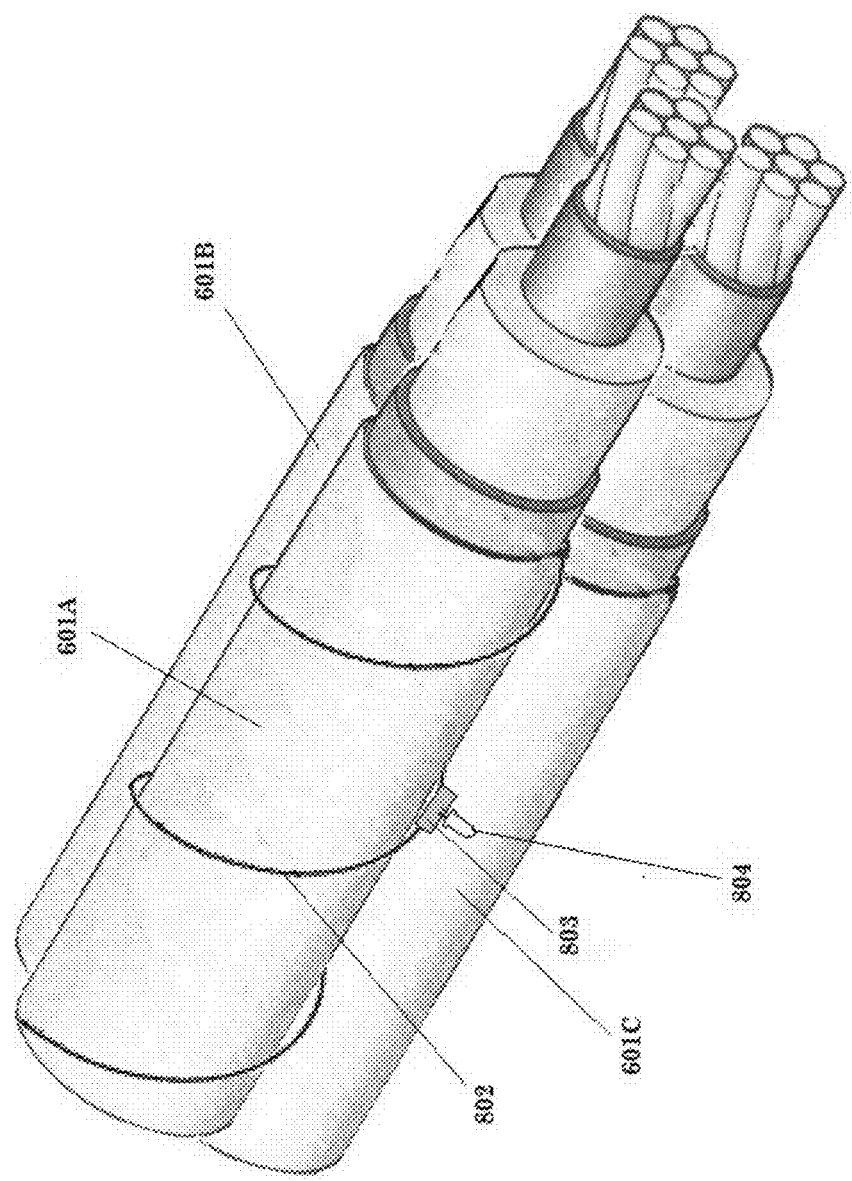

FIG. 13 illustrates a diagram of the energy harvesting device, numbers (802), (803) and (804) already installed in one of the phases (601A) of a three-phase power cable, which in turn, is already accompanied by the other two phases (601B) and (601C) of the three-phase power cable without the energy harvesting device. The load (804) connected to the coil (803) is a particular one: a light-emitter (LED). This figure corresponds to the application example and is a particular case of the energy harvesting device application.

Figure 14:
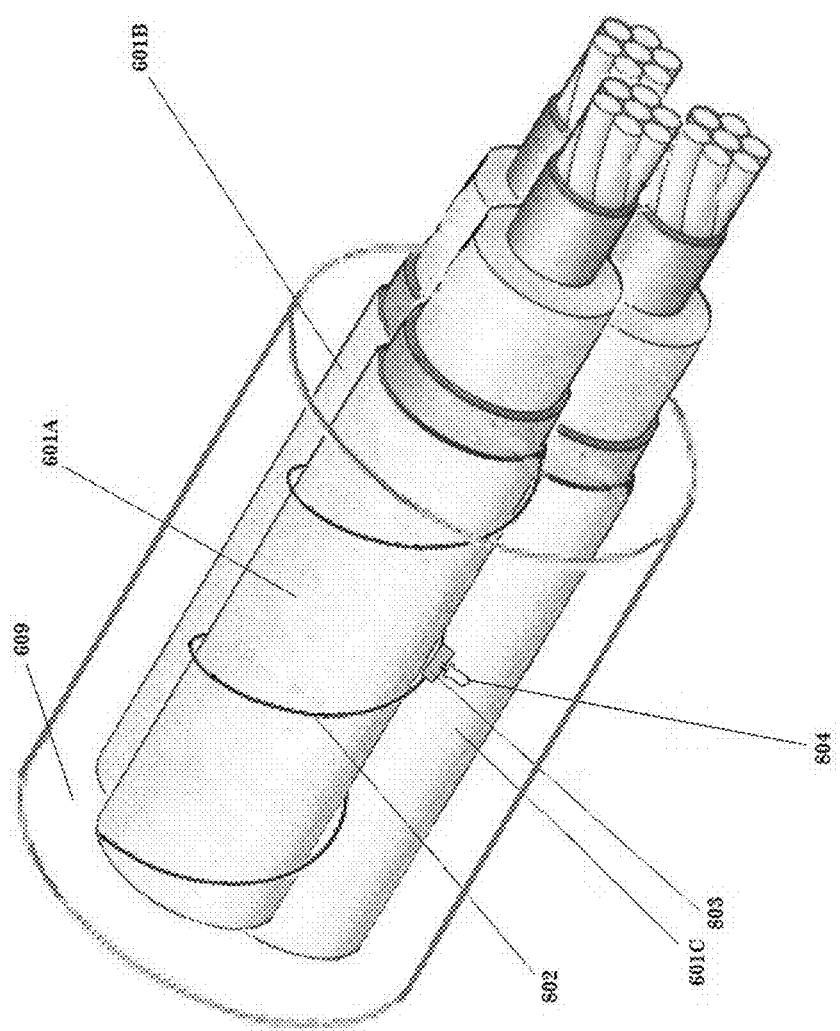

FIG. 14 represents a diagram of a three-phase power cable with all its components with the outer jacket of the energy harvesting system inside the cable (number 609) and with the energy harvesting device (802), (803) and (804), already assembled in one of the phases (601) of a three-phase power cable. The load seen connected to the coil is a particular load: a light-emitter LED. This figure corresponds to the application example and is a particular case of the energy harvesting device application. The new element in this representation is:

The outer jacket (609) of the energy harvesting system inside the cable. For this particular application in which the load (804) connected to the coil (803) is a light-emitter LED, the jacket is translucent such that the light emitted from inside the cable may be seen from outside the cable.

Figure 15:
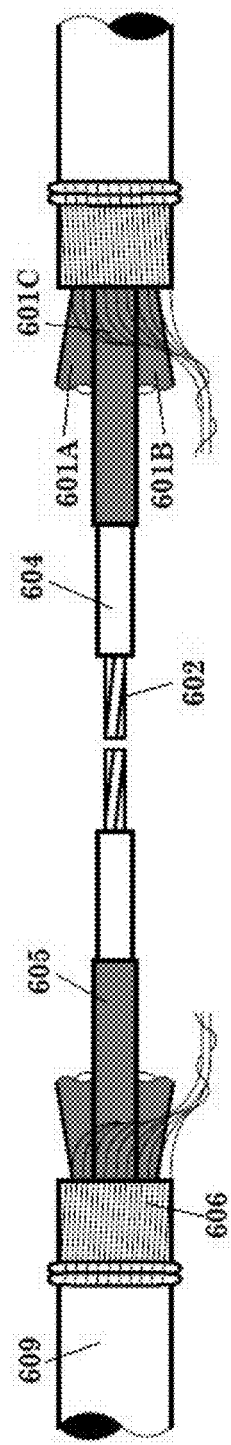

FIG. 15 depicts a diagram of a medium-voltage three-phase cable being repaired. The figure shows each of the constituent layers of the cable that has to be reconstituted in order to perform the repair.

Figure 16:
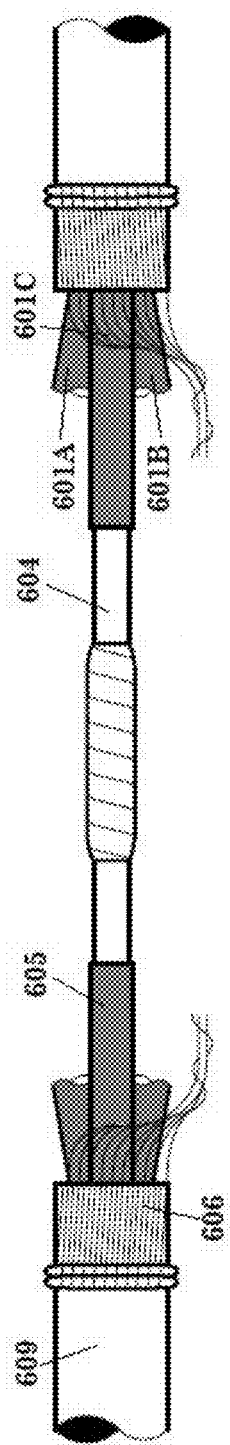

FIG. 16 shows a diagram of a medium-voltage three-phase cable being repaired. The figure shows each of the constituent layers of the cable that has to be reconstituted in order to perform the repair. It is particularly seen the reconstitution of the innermost semiconducting layer (604) of the cable by using semiconducting tape.

Figure 17:
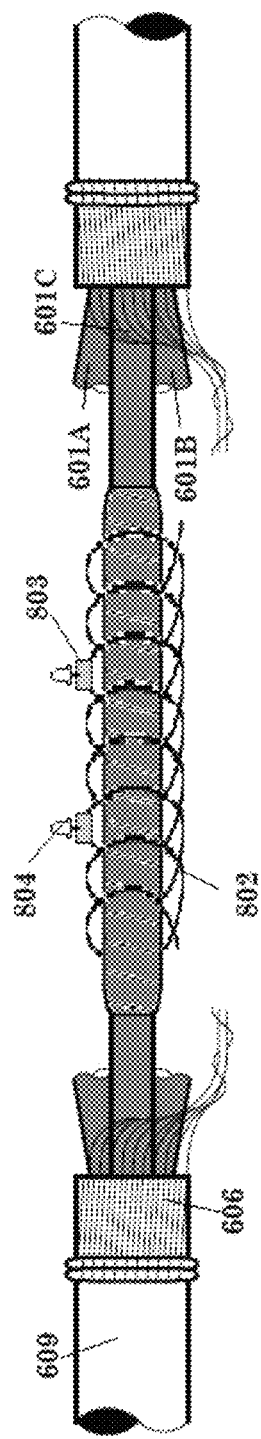

The FIG. 17 shows a wire diagram of a medium-voltage three-phase cable in repair. The figure shows each of the constituent layers of the cable that has to be reconstituted in order to perform the repair. It is particularly seen the stage when the energy harvesting device is embodied together with all its components (iron wire (802), copper coils (803) and loads (804).

Figure 18:
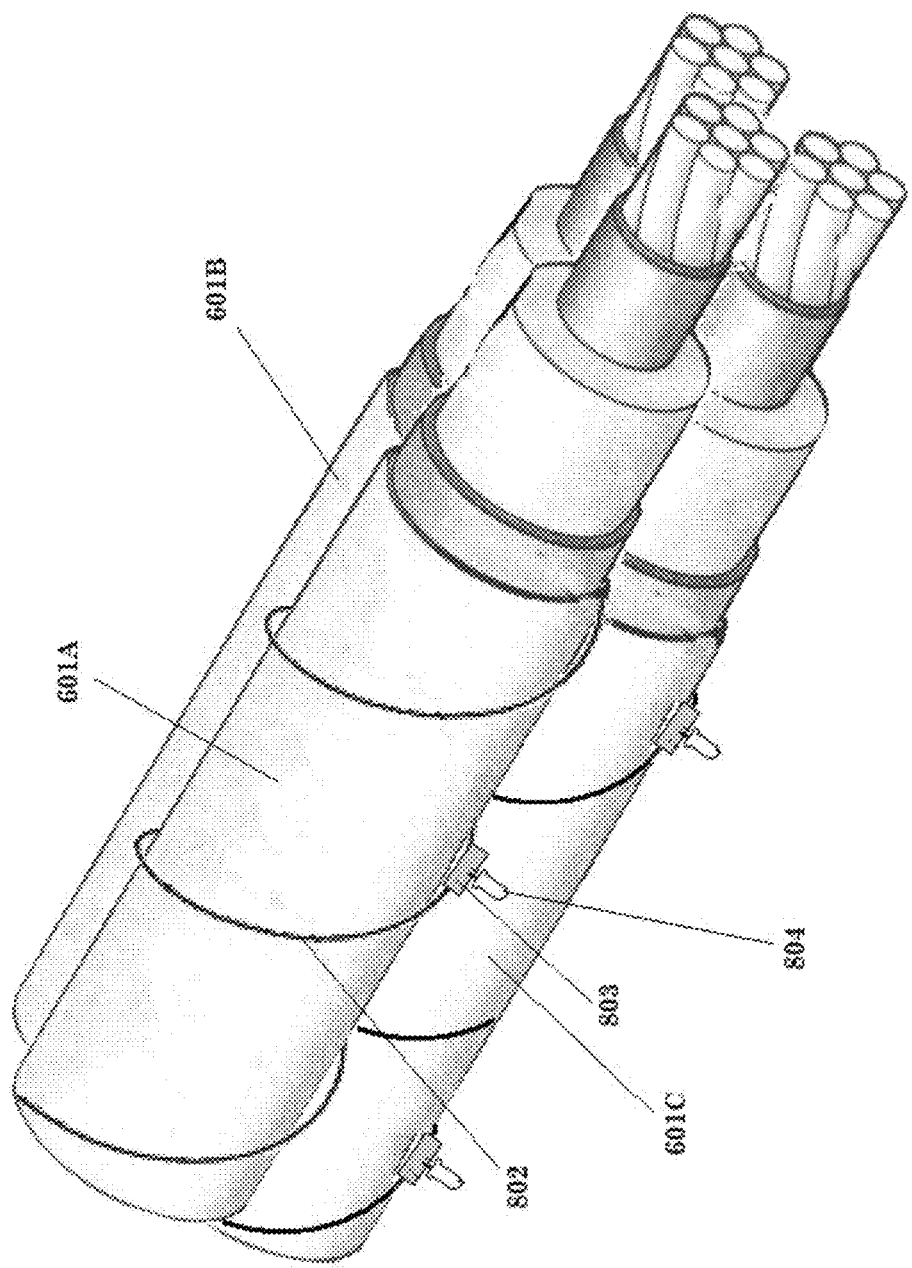

FIG. 18 shows a diagram of the energy harvesting device (802), (803) and (804) already installed in two of the phases of a three-phase power cable. The load seen connected to the coil is a particular load: light-emitter LED.

| | | | Solution | |
|---|---|---|---|---|
| Characteristic | Photoluminescent | Reflective | Cable Electromagnetic Energy | Electromagnetic Energy of the Cable With Accumulator |
| Patent | CL 1705-2009 PCT/IB2009/056024 US2010/0282491 A1 | | This patent application | This patent application |
| Duration of the light | Less than one hour | Indefinite as long as a light ray incides in a certain angle | Indefinite while current circulates through the cable | Indefinite as long as current circulates through the cable and/or there is charge in the accumulator |
| Intensity of the light | Low | High | High | High |
| -Dependence of the energy source | Sun light | Incident light | Current circulation through the cable | Current circulation through the cable and charge of the accumulator |
| Operation in tunnel | Not possible | Possible | Possible. Can serve as guide for the emergency exit | Possible. Can serve as guide for the emergency exit even when there is no current in the cable |
| Emission of other signals | Not possible | Not possible | Possible. Telecommunications (radiofrequency, GPS, etc.) sound, etc. | Possible. Telecommunications (radiofrequency, GPS, etc.) sound, etc. |

The invention claimed is:

1. An electromagnetic energy harvesting system for use in a power cable having one or more phases, comprising:

at least one electromagnetic energy harvesting device provided within the power cable and without direct electrical contact to a main conductor of the cable, wherein the electromagnetic energy harvesting device comprises:

a ferrous wire configured to capture and concentrate an alternating electromagnetic field produced by an alternating current flowing through the main conductor, wherein the ferrous wire includes:
  a ferrous core that is continuous and open and configured to harvest an amount of energy from the main conductor,
  a conductive, insulated wire wound over the ferrous core, thereby forming a coil, and
  wherein the ferrous wire is wound helically and individually around the main conductor of the power cable; and
wherein the energy harvesting device is connected to one or more load devices configured to consume energy extracted by the electromagnetic energy harvesting device, and wherein electric current flows through the main conductor about which the at least one electromagnetic energy harvesting device is wound and whereby the electromagnetic harvesting device is a power source for the one or more load devices connected to the coil.

2. The system of claim 1, wherein the system is circumscribed to the cable's diameter.

3. The system of claim 1, wherein the cable has a polymeric jacket.

4. The system of claim 1, wherein the cable used is three-phase.

5. The system of claim 4, wherein the cable has a transparent polymeric jacket.

6. The system of claim 1, wherein the cable used is single-phase.

7. The system of claim 6, wherein, the cable has a transparent polymeric jacket.

8. The system of claim 1, wherein the cable is one or more of: bare, protected and insulated.

9. The system of claim 1, wherein the cable comprises one of: low, medium and high voltage cable.

10. The system of claim 1, wherein the electromagnetic energy extraction device comprises a continuous helicoidal ferrous core and multiple coils of conductive insulated wire wound around the ferrous core; and
  wherein the system further comprises:
    load devices connected to respective coils, wherein a load device is one or more of: a device consumes the energy extracted by the system and an energy accumulator.

11. The system of claim 10, wherein the continuous helicoidal ferrous core is manufactured of a ferromagnetic material.

12. The system of claim 11, wherein the ferrous core is helicoidal and having an open core that has ends that are spaced apart.

13. The system of claim 10, wherein each coil is manufactured of an electrically conductive material that is insulated electrically including annealed enameled copper.

14. The system of claim 10, wherein the load devices consume the power delivered by respective coils.

15. The system of claim 14, wherein the load devices that consume the energy delivered by the respective coils comprise different devices including an LED.

16. The system of claim 10, wherein the accumulators are configured to store the energy delivered by the coil and are capable of liberating it whether or not current exists in the conductor.

17. The system of claim 16, wherein the accumulators that store the energy delivered by the coil comprise capacitors, supercapacitors and/or batteries.

18. The system of claim 10, wherein the electromagnetic energy extraction device is provided in one or more modules, and wherein the number of modules determined by an extent of the electromagnetic energy extraction system to be placed.

19. The system of claim 1, wherein the electromagnetic energy extraction system is used under adverse weather conditions because as it is comprised within the cable's diameter, exposing a smaller surface area to be affected by environmental conditions.

20. The system of claim 1, wherein the electromagnetic energy extraction system is used in the localization of the system's position.

21. The system of claim 20, wherein the electromagnetic energy extraction is used in the localization of one or more of: submarine cables, high voltage lines, and overhead cables.

22. The system of claim 1, wherein the electromagnetic energy extraction is used in the illumination and identification of the system.

23. The system of claim 22, wherein the electromagnetic energy extraction system is used in one or more of: the illumination and identification of underground tunnels, urban and rural illumination, identification of specific cables or phases, and identification of the presence of current.

24. The system of claim 1, wherein the electromagnetic energy extraction system is used in the monitoring of the system's variables.

25. The system of claim 24, wherein the electromagnetic energy extraction system is used in the monitoring of one or more of: operation variables, variables of electric parameters, physical variables in the transmission networks and substations, and environmental variables.

26. The system of claim 1, wherein the electromagnetic energy extraction system is used in the emission of sounds.

27. The system of claim 26, wherein the electromagnetic energy extraction system is used in the emission of sounds as deterrent of one or more of: birds, rodents or insects.

28. The system of claim 1, wherein the electromagnetic energy extraction system is used as a storage battery.

29. The system of claim 1, wherein the electromagnetic energy extraction system is used to capture an electromagnetic field.

30. The system of claim 26, wherein the electromagnetic energy extraction system is used to capture an electromagnetic field produced in the power cables, because the entire magnetic field generated is consumed through the charges.

31. The system of claim 1, wherein the electromagnetic energy extraction system is configured to extract electric power from the power cable, using the electromagnetic energy generated by the circulation of current within the power cable.

* * * * *